United States Patent
Chen

(10) Patent No.: US 8,239,102 B2
(45) Date of Patent: Aug. 7, 2012

(54) VEHICLE SAFETY SYSTEM AND METHOD WITH AUTOMATIC ACCIDENT REPORTING

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 505 days.

(21) Appl. No.: 12/511,263

(22) Filed: Jul. 29, 2009

(65) Prior Publication Data
US 2010/0070140 A1   Mar. 18, 2010

(30) Foreign Application Priority Data
Sep. 16, 2008  (CN) .......................... 2008 1 0304523

(51) Int. Cl.
*B60R 22/00* (2006.01)
(52) U.S. Cl. ............ 701/45; 701/47; 340/438; 180/271; 280/734
(58) Field of Classification Search .................... 701/45, 701/46, 47, 412; 340/438, 903; 180/271; 280/734, 735
See application file for complete search history.

(56) References Cited

U.S. PATENT DOCUMENTS
7,527,288 B2 * 5/2009 Breed .......................... 280/735

FOREIGN PATENT DOCUMENTS
JP        2004-348254 A   12/2004
* cited by examiner

*Primary Examiner* — Gertrude Arthur Jeanglaude
(74) *Attorney, Agent, or Firm* — Altis Law Group, Inc.

(57) ABSTRACT

A vehicle safety system includes a motion detecting device, a control module, a positioning module, and a wireless transmitting module. The motion detecting device is configured for sensing the motion of a vehicle and recording corresponding motion data. The control module is configured for analyzing the motion data and judging whether an accident has occurred to the vehicle based upon the analysis. The positioning module is configured for obtaining position coordinates of the vehicle. The wireless transmitting module is configured for automatically making contact with and reporting the position coordinates of the vehicle to a remote service station when an accident has occurred to the vehicle.

9 Claims, 3 Drawing Sheets

VEHICLE SAFETY SYSTEM AND METHOD WITH AUTOMATIC ACCIDENT REPORTING

BACKGROUND

1. Technical Field

The present disclosure relates to safety systems and methods and, particularly, to vehicle safety systems and methods.

2. Description of Related Art

New technologies are constantly introduced and applied in automobiles; for example, global positioning systems (GPSs), safety systems, and so on. Safety systems such as emergency dialing devices are becoming more and more common as standard features/equipment on production vehicles. Generally, an emergency dialing device installed in a vehicle can enable the driver and passengers to call for help when an accident occurs. However, in the event of a fatal accident or one in which the driver and passengers are unable to call (e.g. due to wounding or unconsciousness), manual operation of the dialing device is not possible. In such cases, emergency assistance may be delayed.

Therefore, it is desirable to provide a vehicle safety system and method which can overcome or at least alleviate the above-mentioned problems.

DETAILED DESCRIPTION

Embodiments of the disclosure will now be described in detail with reference to the accompanying drawings.

Figure 1:
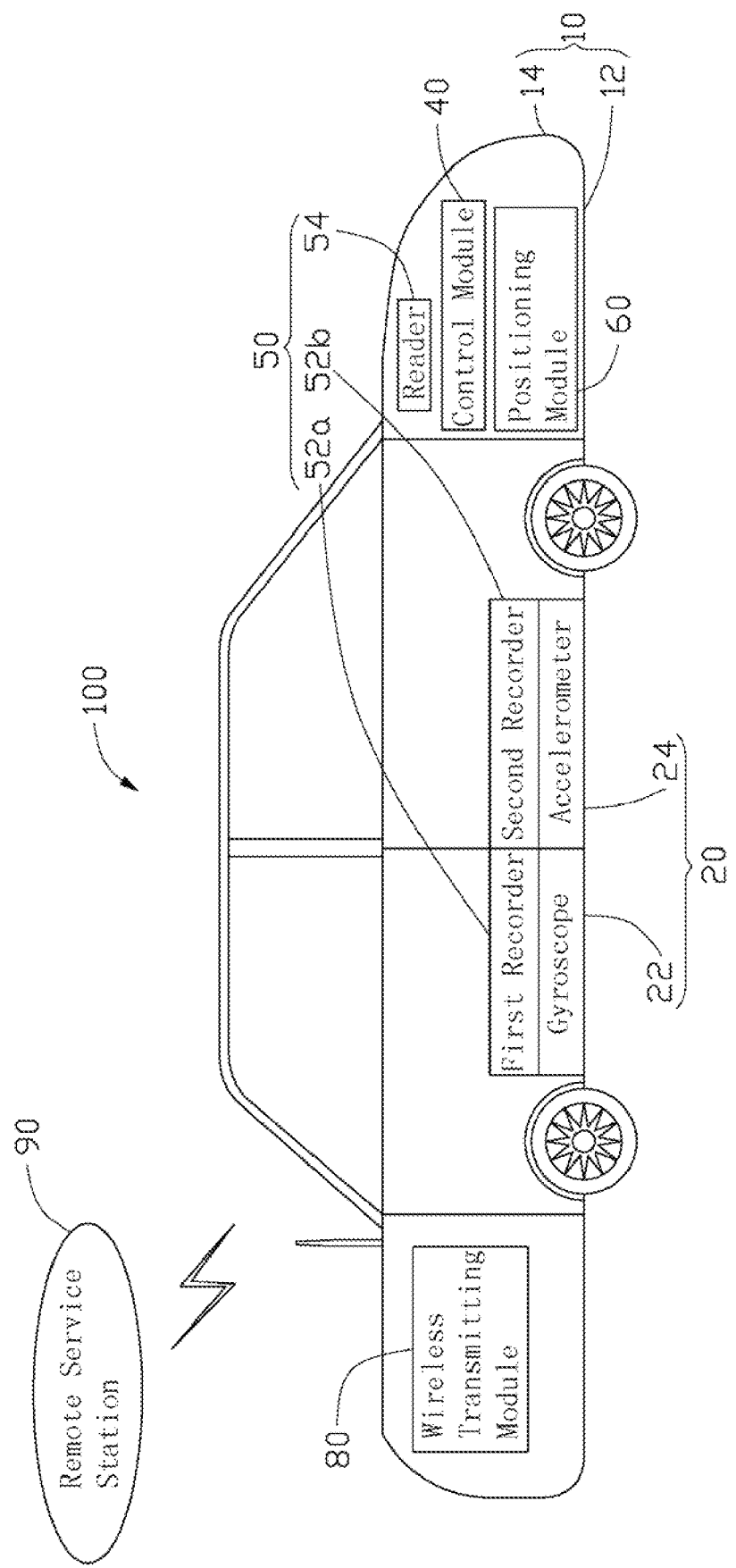
FIG. 1 is a schematic view of a vehicle safety system according to an exemplary embodiment.

Referring to FIG. 1, this shows a vehicle safety system 100 according to an exemplary embodiment. The vehicle safety system 100 is for a vehicle 10 such as a car. The vehicle safety system 100 can automatically contact a remote service station 90 when an accident happens. The vehicle safety system 100 includes a motion detecting device 20, a control module 40, a positioning module 60, and a wireless transmitting module 80. The vehicle 10 includes a chassis 12 and a body 14. The body 14 is disposed on the chassis 12. The motion detecting device 20 is attached to the chassis 12. The control module 40, the positioning module 60, and the wireless transmitting module 80 are housed in the body 14.

The motion detecting device 20 is configured (i.e. structured and arranged) for detecting motions of the vehicle 10 and recording corresponding motion data of the vehicle 10. In this embodiment, the motion detecting device 20 includes a gyroscope 22 and an accelerometer 24. The gyroscope 22 is configured for sensing an angular momentum of the vehicle 10. The accelerometer 24 is configured for sensing an acceleration of the vehicle 10. Generally, the chassis 12 is the main supporting structure of the vehicle 10. Therefore, in order to achieve high sensitivity and accurately sense the angular momentum and the acceleration of the vehicle 10, the gyroscope 22 and accelerometer 24 are attached in a middle portion of the chassis 12.

The control module 40 is configured for judging whether an accident has occurred to the vehicle 10 based upon an analysis of the motion data. In detail, if the motion data satisfies predetermined conditions, it is determined that an accident has occurred. For example, if the angular momentum and the acceleration suddenly and strongly increase, it is determined that the vehicle 10 may have been hit or suffered a hard impact, causing the vehicle to revolve and suddenly stop. In this embodiment, the control module 40 includes a memory 42 and a judging unit 44. The memory 42 is configured for storing the predetermined conditions. In this embodiment, the predetermined conditions can be preset by manufacturers and selectively altered by users. The judging unit 44 is configured for judging whether the sensed angular momentum and the sensed acceleration satisfy the predetermined conditions. In practice, the control module 40 is also configured for activating the wireless transmitting module 80 when an accident happens.

In order to allow the control module 40 to communicate with the motion detecting device 20 wirelessly, the vehicle safety system 100 further includes a radio frequency identification (RFID) system 50. The RFID system 50 includes a first recorder 52a, a second recorder 52b, and a reader 54. The first recorder 52a and the second recorder 52b are mechanically and electrically connected to the gyroscope 22 and the accelerometer 24, respectively. The angular momentum of the vehicle 10 sensed by the gyroscope 22, and the acceleration of the vehicle 10 sensed by the accelerometer 24, are written into the first recorder 52a and the second recorder 52b respectively. The reader 54 is mechanically and electrically connected to the control module 40 through the judging unit 44. The reader 54 communicates with the first recorder 52a and the second recorder 52b wirelessly using radio signals. In this embodiment, the frequency of the radio signals is 13.56 megahertz (MHz).

In operation of the RFID system 50, inner antennas (not shown) of the first recorder 52a and the second recorder 52b output modulated radio signals carrying the information of the sensed angular momentum and sensed acceleration to an antenna (not shown) of the reader 54. The antenna of the reader 54 receives and demodulates the radio signals to obtain the sensed angular momentum and sensed acceleration, and outputs this information to the judging unit 44 wirelessly. Thus, the judging unit 44 can wirelessly receives the sensed angular momentum and sensed acceleration originating from the motion detecting device 20 via the RFID system 50.

Figure 2:
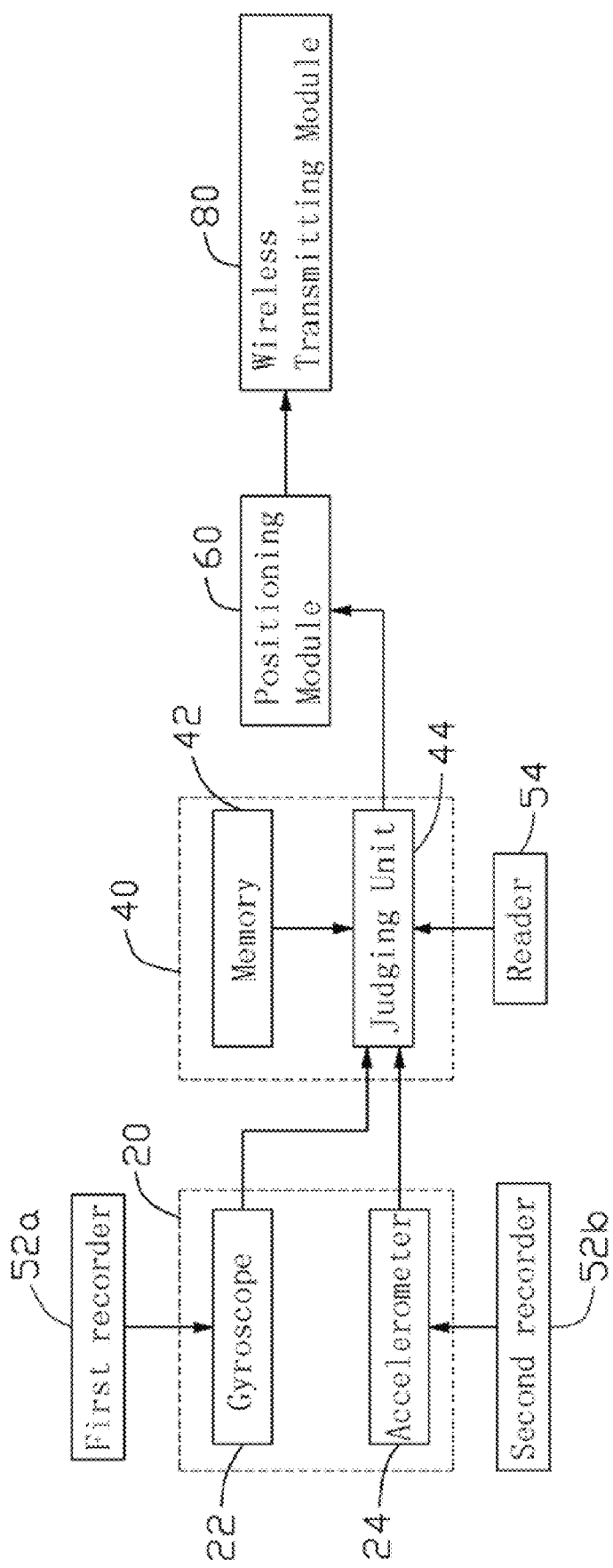
FIG. 2 is a block diagram of the vehicle safety system shown in FIG. 1.

Referring to FIG. 2, the positioning module 60 is configured for obtaining position coordinates of the vehicle 10. The positioning module 60 is housed in the body 14, and is electrically connected to the judging unit 44 and the wireless transmitting module 80. In this embodiment, the positioning module 60 is a Global Positioning System (GPS) receiver.

The wireless transmitting module 80 is configured for making contact with and reporting the position coordinates of the vehicle 10 to the remote service station 90 via, for example, an emergency call. In the present embodiment, the emergency call is an automatic wireless call from the vehicle 10 to the remote station 90 when an accident has occurred. The working frequency of the wireless transmitting module 80 may be 2.3 Hz, 2.5 Hz, or 3.5 GHz.

In this embodiment, sites corresponding to the position coordinates are stored in the remote service station 90. Therefore, the site of the vehicle 10 can be obtained from the remote service station 90 according to the position coordinates of the vehicle 10.

Figure 3:
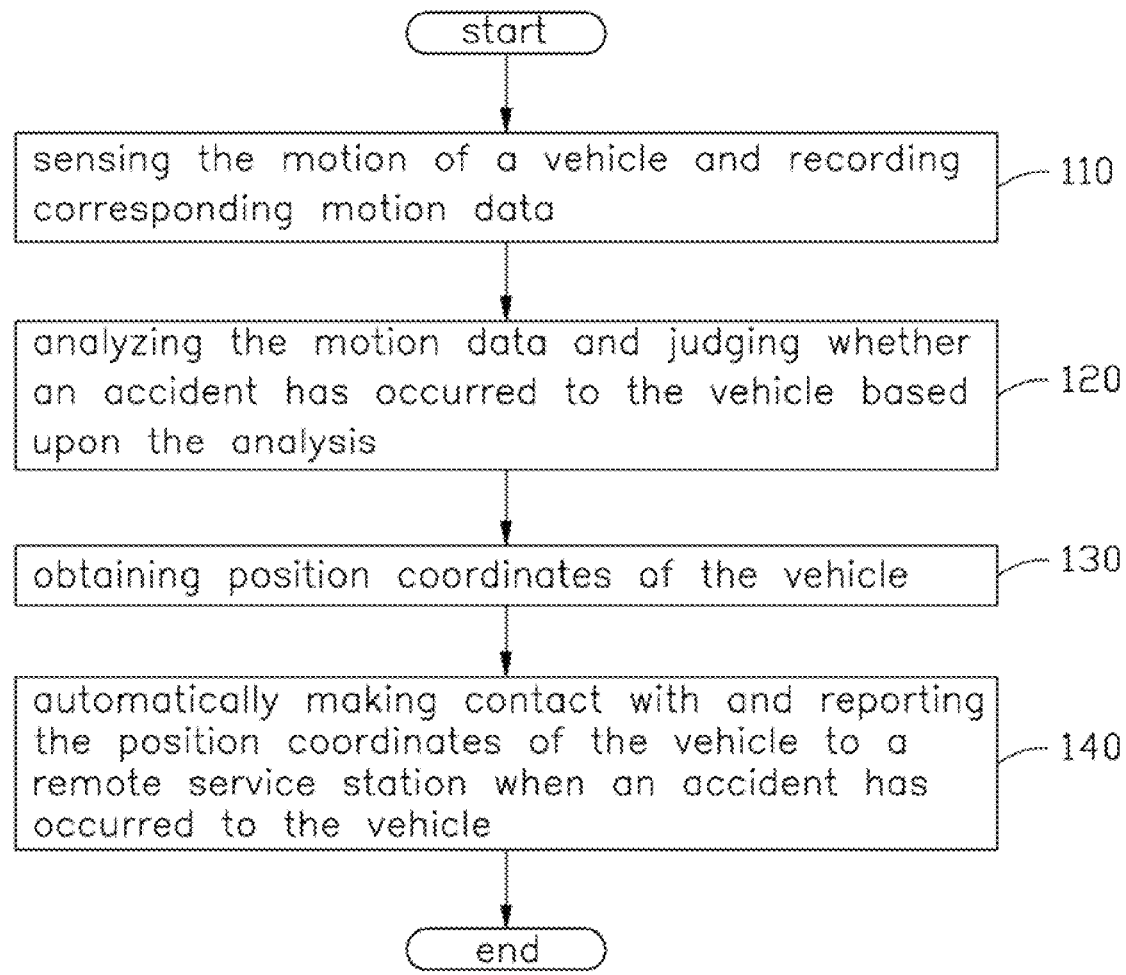
FIG. 3 is a flowchart of a vehicle safety method according to an exemplary embodiment.

Referring to FIG. 3, a vehicle safety method according to an exemplary embodiment includes the following steps S110-S140. The vehicle safety method can for example be implemented by the vehicle safety system 10.

In step 110, the motion detecting device 20 senses motions of the vehicle 10 and records corresponding motion data of the vehicle 10. In this embodiment, the gyroscope 22 senses an angular momentum of the vehicle 10. The accelerometer 24 senses an acceleration of the vehicle 10.

In step 120, the predetermined conditions are stored in the memory 42. The judging unit 44 judges whether the sensed angular momentum and the sensed acceleration satisfy the predetermined conditions. In this embodiment, the judging unit 44 communicates with the gyroscope 22 and the accelerometer 24 wirelessly via the radio frequency identification (RFID) system 50.

In step 130, the positioning module 60 obtains position coordinates of the vehicle 10. In this embodiment, the positioning module 60 is a Global Positioning System (GPS) receiver.

In step 140, the wireless transmitting module 80 automatically makes contact with and reports the position coordinates of the vehicle 10 to the remote service station 90 via, for example, an emergency call.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A vehicle safety system comprising:
    a motion detecting device configured for sensing the motion of a vehicle and recording corresponding motion data, the motion detecting device comprising a gyroscope configured for sensing an angular momentum of the vehicle, and an accelerometer attached in the vehicle and configured for sensing an acceleration of the vehicle;
    a control module configured for analyzing the motion data and judging whether an accident has occurred to the vehicle based upon the analysis;
    a radio frequency identification system configured for providing wireless communication between the motion detecting module and the control module; the radio frequency identification system comprising a first recorder mechanically and electrically connected to the gyroscope and a second recorder mechanically and electrically connected to the accelerometer, such that the sensed angular momentum is capable of being written into the first recorder, and the sensed acceleration is capable of being written into the second recorder;
    a positioning module configured for obtaining position coordinates of the vehicle; and
    a wireless transmitting module configured for automatically making contact with and reporting the position coordinates of the vehicle to a remote service station when an accident has occurred to the vehicle.

2. The vehicle safety system of claim 1, wherein the control module comprises a memory configured for storing predetermined conditions, and a judging unit configured for judging whether the obtained motion data satisfy the predetermined conditions.

3. The vehicle safety system of claim 2, wherein the motion detecting device is capable of being attached to a chassis of the vehicle.

4. The vehicle safety system of claim 2, wherein the judging unit is configured for judging whether the sensed angular momentum satisfies the predetermined condition.

5. The vehicle safety system of claim 1, wherein the judging unit is configured for judging whether the sensed acceleration satisfies the predetermined condition.

6. The vehicle safety system of claim 1, wherein the radio frequency identification system further comprises a reader mechanically and electrically connected to the control module and configured for receiving the sensed angular momentum and the sensed acceleration from the first recorder and the second recorder respectively using radio signals.

7. The vehicle safety system of claim 1, wherein the positioning module comprises a Global Positioning System receiver.

8. A vehicle safety method comprising:
    sensing the motion of a vehicle and recording corresponding motion data, the motion data comprising an angular momentum of the vehicle and an acceleration of the vehicle;
    writing the sensed angular momentum and the sensed acceleration, and outputting the sensed angular momentum and sensed acceleration, wirelessly;
    analyzing the motion data and judging whether an accident has occurred to the vehicle based upon the analysis;
    obtaining position coordinates of the vehicle; and
    automatically making contact with and reporting the position coordinates of the vehicle to a remote service station when an accident has occurred to the vehicle.

9. The vehicle safety method of claim 8, wherein the analyzing comprises judging whether the motion data satisfies one or more predetermined conditions.

* * * * *